US012579848B2

(12) United States Patent
Gill et al.

(10) Patent No.: US 12,579,848 B2
(45) Date of Patent: Mar. 17, 2026

(54) SMART SYSTEMS AND CONTROL LOGIC FOR AUTOMATED SELF-DETECT AND VIOLATION-NOTIFICATION MODE FOR CONNECTED VEHICLES

(71) Applicant: GM GLOBAL TECHNOLOGY OPERATIONS LLC, Detroit, MI (US)

(72) Inventors: Baljeet S. Gill, Stouffville (CA); Lakshmi V. Thanayankizil, Rochester Hills, MI (US); Xu Fang Zhao, LaSalle (CA); Frank C. Fisk, Lawrenceville, GA (US)

(73) Assignee: GM Global Technology Operations LLC, Detroit, MI (US)

( * ) Notice: Subject to any disclaimer, the term of this patent is extended or adjusted under 35 U.S.C. 154(b) by 313 days.

(21) Appl. No.: 18/360,192

(22) Filed: Jul. 27, 2023

(65) Prior Publication Data
US 2025/0037517 A1     Jan. 30, 2025

(51) Int. Cl.
*G07C 5/00*     (2006.01)
*B60W 50/14*     (2020.01)

(52) U.S. Cl.
CPC ............. *G07C 5/008* (2013.01); *B60W 50/14* (2013.01); *B60W 2050/143* (2013.01); *B60W 2554/4041* (2020.02)

(58) Field of Classification Search
CPC . G07C 5/008; B60W 50/14; B60W 2050/143; B60W 2554/4041; G08G 1/012; G08G 1/096725; G08G 1/123; H04W 4/90
(Continued)

(56) References Cited

U.S. PATENT DOCUMENTS 5,513,244 A * 4/1996 Joao ......................... B60R 25/33
                                                    340/425.5
7,483,772 B2 1/2009 Oesterling et al.
(Continued)

OTHER PUBLICATIONS

M. Gupta, J. Benson, F. Patwa and R. Sandhu, "Secure V2V and V2I Communication in Intelligent Transportation Using Cloudlets," in IEEE Transactions on Services Computing, vol. 15, No. 4, pp. 1912-1925, Jul. 1-Aug. 2022, doi: 10.1109/TSC.2020.3025993. (Year: 2022).*

(Continued)

*Primary Examiner* — Helal A Algahaim
*Assistant Examiner* — Merritt E Levy
(74) *Attorney, Agent, or Firm* — Quinn IP Law

(57)     ABSTRACT

Presented are vehicle systems and control logic for provisioning self-detection and violation-notification capabilities for connected vehicles, methods for making/using such systems, and vehicles equipped with such systems. A method of controlling operation of a host vehicle includes a resident or remote vehicle controller or network of controllers determining if a wireless communications device of the host vehicle has an active wireless connection with a remote computing node. If so, the vehicle controller(s) receive, from the remote computing node via the wireless communications device, a wireless message containing an emergency alert and culprit data indicative of a target vehicle. The vehicle controller(s) then parse the culprit data from the wireless message and analyze the parsed culprit data to determine if the host vehicle is the target vehicle. If so, the vehicle controller(s) responsively command one or more resident vehicle subsystems to automate one or more remediating actions for the emergency alert.

20 Claims, 2 Drawing Sheets

(58) Field of Classification Search
USPC ........................................................ 701/31.4
See application file for complete search history.

(56) References Cited

U.S. PATENT DOCUMENTS

| | | | |
|---|---|---|---|
| 7,890,243 B2 | 2/2011 | Abendroth | |
| 8,208,892 B2* | 6/2012 | Nalley .................. | H04W 64/00 |
| | | | 340/8.1 |
| 8,731,155 B2 | 5/2014 | Chesnutt et al. | |
| 8,754,766 B2 | 6/2014 | Oesterling et al. | |
| 9,179,311 B2 | 11/2015 | Peirce et al. | |
| 9,282,447 B2 | 3/2016 | Gianakis | |
| 9,440,655 B2 | 9/2016 | Roos et al. | |
| 9,820,124 B1 | 11/2017 | Hosey et al. | |
| 10,434,986 B1 | 10/2019 | Gilbert-Eyres et al. | |
| 10,972,893 B1* | 4/2021 | Vangala .................. | H04W 4/46 |
| 11,110,979 B2 | 9/2021 | Watanabe et al. | |
| 2004/0124707 A1* | 7/2004 | Boggs ..................... | B60R 25/04 |
| | | | 307/10.5 |
| 2006/0250272 A1* | 11/2006 | Puamau .................. | G08C 17/02 |
| | | | 701/2 |
| 2007/0288127 A1* | 12/2007 | Haq ........................ | B60R 25/10 |
| | | | 701/2 |
| 2009/0168974 A1 | 7/2009 | Mc Cormick | |
| 2014/0201064 A1* | 7/2014 | Jackson .................. | G08G 1/205 |
| | | | 705/38 |
| 2018/0114076 A1* | 4/2018 | Miller .................. | G06V 20/584 |
| 2019/0096215 A1* | 3/2019 | Shahid ............... | G08G 1/09626 |
| 2019/0161057 A1* | 5/2019 | Alderman ............... | B60R 25/31 |
| 2021/0037386 A1 | 2/2021 | Oesterling et al. | |
| 2021/0165110 A1 | 6/2021 | Neely et al. | |
| 2022/0402458 A1 | 12/2022 | Gilbert-Eyres et al. | |
| 2023/0303122 A1* | 9/2023 | Geyer .................. | G06V 20/625 |

OTHER PUBLICATIONS

M. Mitchell, M. Hudnall, D. Brown, D. Cordes, R. Smith and A. Parrish, "A Host Architecture for Automobile License Plate Recognition," 2007 IEEE Intelligence and Security Informatics, New Brunswick, NJ, USA, 2007, pp. 87-94, doi: 10.1109/ISI.2007. 379539. (Year: 2007).*

Q. Zhang, Q. Zhang, W. Shi and H. Zhong, "Distributed Collaborative Execution on the Edges and Its Application to AMBER Alerts," in IEEE Internet of Things Journal, vol. 5, No. 5, pp. 3580-3593, Oct. 2018, doi: 10.1109/JIOT.2018.2845898. (Year: 2018).*

R. Ashtari, S. Mao and M. C. Hamilton, "A low-cost NLOS ultra-violet V2I identification system for vehicular theft recovery," 2013 International Conference on Connected Vehicles and Expo (ICCVE), Las Vegas, NV, USA, 2013, pp. 785-790, doi: 10.1109/ICCVE.2013.6799897. (Year: 2013).*

* cited by examiner

SMART SYSTEMS AND CONTROL LOGIC FOR AUTOMATED SELF-DETECT AND VIOLATION-NOTIFICATION MODE FOR CONNECTED VEHICLES

INTRODUCTION

The present disclosure relates generally to motor vehicles with wireless communication capabilities. More specifically, aspects of this disclosure relate to systems and methods for automating wireless notifications for connected vehicles.

Current production motor vehicles, such as the modern-day automobile, are equipped with a network of onboard controllers, sensors, and communications devices that enable a variety of vehicle services, such as navigation assistance, cellular connectivity, and multimedia entertainment. To provide vehicle occupants with telecommunications and informatics functionality, for example, many passenger compartments are now furnished with a center-stack telematics unit that operates as both a human-machine interface (HMI) and an in-vehicle computing device. The telematics unit may wirelessly connect to a cellular network and a satellite service for such purposes as real-time navigation, customer support, vehicle diagnostics, traffic data, and digital "streaming" radio. In general, the telematics unit functions as a bidirectional radio transceiver that is able to simultaneously transmit and receive data in the form of network data packets. Data packets may be transmitted via ultra-high frequency (UHF) or super-high frequency (SHF) radio signals from a cell tower to a cellular-enabled vehicle via downlink (or download) transmission and, conversely, may be transmitted via uplink (or upload) transmission from the vehicle to a cell tower.

With improved short-range and long-range communications capabilities, many telematics units are now able to wirelessly transmit vehicle and occupant data to a myriad of remotely located third-party recipients, such as a back-office (BO) vehicle service provider that facilitates automated services and live-advisor assistance. Roadside assistance services, for example, enable the vehicle telematics system to contact a BO service provider for engaging a local vendor to provide vehicle towing, jump-starting, or maintenance services. Many modern vehicles also have the ability to gather vehicle operating and diagnostic data, which may be sent via the telematics device to a BO service provider for storage, analysis, and feedback. However, many telematics units are not able to connect directly to first responders or transmit vehicle data directly to first responders during an emergency event.

SUMMARY

Presented herein are smart vehicle systems with attendant control logic for provisioning self-detection and violation-notification capabilities for connected vehicles, methods for operating and methods for making such systems, and wireless-enabled "talking" vehicles equipped with such systems. By way of non-limiting example, systems and methods are presented for a subject "host" vehicle to automatically self-identify as a target "culprit" vehicle and concomitantly alert law enforcement or other first responder. In a specific application, law enforcement may broadcast a cellular message containing an amber alert with information identifying a suspected culprit. A host vehicle may systematically scan for these broadcast alerts via various modalities, such as an in-vehicle telematics unit, occupant-borne smartphone, satellite telephony service, vehicle-to-vehicle (V2V) or vehicle-to-everything (V2X) data exchange (e.g., DSRC, mesh, BLE, WiFi, other), etc. Upon receipt, the host vehicle temporarily stores and parses relevant data from the alert, which may include a license plate number, a vehicle identification number (VIN), make/model/trim/color data, driver information, etc. From this information, the host vehicle may determine whether it is in fact the target vehicle; if so, the host vehicle may automatically alert law enforcement of its identify and location as well as take ameliorative action, e.g., to slow, stop, and/or disable the host vehicle. If not the culprit, the host vehicle may actively employ an on-vehicle network of sensing and communication devices to systematically scan for the target vehicle. Using ADAS vehicle cameras and "stealth" V2V data exchanges, the host vehicle may identify the target vehicle and concomitantly alert law enforcement with real-time location, heading, pictures, etc.

Attendant benefits for at least some disclosed concepts include control systems and programmable logic that automate a self-detection and violation-notification operating mode that minimizes or outright eliminates the need for human intervention to help identify a target vehicle during an emergency situation. Disclosed systems and methods may leverage a vehicle's wireless and sensing capabilities to automate and enhance target vehicle identification. Other attendant benefits may include expanding and expediting real-time target vehicle identification and location capabilities through crowd-sourced cellular, satellite, and V2X data exchanges. Additionally, the host may employ a "stealth" V2V data exchange to identify a target vehicle without the knowledge of the vehicle's driver.

Aspects of this disclosure are directed to vehicle control protocols, system control logic, and memory-stored instructions for provisioning self-detection and violation-notification (SDVN) operating modes for connected vehicles. In an example, a method is presented for controlling operation of a host vehicle, which has wireless short-range communications (SRC) and/or long-range communications (LRC) features (collectively "wireless communications device") and a resident or remote controller or module or network of controllers/modules (collectively "controller"). This representative method includes, in any order and in any combination with any of the above and below disclosed options and features: determining, e.g., via the host vehicle's controller assessing an LRC device or an occupant's smartphone, whether or not the wireless communications device has an active wireless connection with a remote computing node; receiving, e.g., from the remote computing node via the wireless communications device, a wireless message containing an emergency alert and culprit data indicative of a target vehicle (e.g., amber alert text, push, email, etc., specifying the alert type and perpetrator information); parsing, e.g., and saving to resident cache memory via the controller, the culprit data from the wireless message; analyzing, e.g., via the controller without driver knowledge or input, the parsed culprit data to determine if the host vehicle is the target vehicle; and transmitting, e.g., via the host vehicle's controller responsive to confirming the host vehicle is the target vehicle, one or more command signals to one or more resident vehicle subsystems of the host vehicle to automate one or more remediating actions for the emergency alert.

Aspects of this disclosure are also directed to computer-readable media (CRM) for provisioning SDVN operating modes for connected vehicles. In an example, a non-transitory CRM stores instructions that are executable by one or more processors of a host vehicle's controller. When executed, these instructions cause the host vehicle's controller to perform operations, including: determining if a wireless communications device of the host vehicle has an active cellular connection with a remote computing node via a cellular telecommunication network; receiving, from the remote computing node via the wireless communications device, a wireless message containing an emergency alert and culprit data indicative of a target vehicle; parsing the culprit data from the wireless message; analyzing the parsed culprit data to determine if the host vehicle is the target vehicle; and responsive to determining the host vehicle is the target vehicle, commanding a resident vehicle subsystem of the host vehicle to automate a remediating action for the emergency alert.

Additional aspects of this disclosure are directed to connected vehicles with SDVN capabilities. As used herein, the terms "vehicle" and "motor vehicle" may be used interchangeably and synonymously to reference any relevant vehicle platform, such as passenger vehicles (internal combustion engine (ICE), hybrid-electric vehicle (HEV), full-electric vehicle (FEV), fuel cell, fully and partially autonomous, etc.), commercial vehicles, industrial vehicles, tracked vehicles, all-terrain vehicles, motorcycles, watercraft, aircraft, etc. In an example, a motor vehicle includes a vehicle body with a passenger compartment, multiple road wheels mounted to the vehicle body (e.g., via corner modules coupled to a unibody or body-on-frame chassis), and other standard original equipment. A powertrain system of the vehicle may include an engine (e.g., for ICE powertrains) or one or more electric traction motors that operate alone (e.g., for FEV powertrains) or in conjunction with an internal combustion engine (e.g., for HEV powertrains) to selectively drive one or more of the road wheels to propel the vehicle. The vehicle is also equipped with one or more wireless communications devices, which may be in the nature of a cellular-enabled device, a satellite transceiver module, a DSRC device, a BLUETOOTH® device, etc.

Continuing with the preceding discussion, the vehicle is also equipped with a vehicle controller (e.g., single controller, network of controllers, resident/remote controller or module, etc.) that is programmed to confirm that the vehicle's wireless communications device has an active wireless connection with a remote computing node. If active, the subject vehicle's controller communicates with the remote computing node via the wireless communications device to receive a wireless message, which contains an emergency alert and culprit data indicative of a target vehicle associated with the emergency alert. Once received, the controller parses the culprit data from the wireless message, and then analyzes the parsed culprit data to determine if the host vehicle is the target vehicle. If so, the controller responsively commands one or more resident vehicle subsystems of the host vehicle to automate one or more remediating actions for the emergency alert.

For any of the disclosed vehicles, methods, and CRM, the vehicle controller may respond to determining that the host vehicle is not the target vehicle by employing one or more on-vehicle sensing devices to scan third-party vehicles proximal the host vehicle, and determine if one of these scanned third-party vehicles is the target vehicle. If one is, the host vehicle may responsively command its resident telematics unit to transmit an alert message to a first responder with location data and identification data for the scanned third-party vehicle identified as the target vehicle. As a further option, the vehicle controller may receive, via the wireless communications device, a wireless cancellation message cancelling the emergency alert. In this instance, the controller may responsively command one or more sensing devices of the host vehicle to discontinue scanning third-party vehicles proximal the host vehicle for the target vehicle. Optionally, the target vehicle's culprit data may include a license plate number, a vehicle identification number, an internet protocol address, a vehicle color, a vehicle make and model, and/or any other identifying data.

For any of the disclosed vehicles, methods, and CRM, the vehicle's wireless communications device may include a cellular-enabled modem of a telematics unit located inside the host vehicle. In this instance, the vehicle controller may respond to the host vehicle being the target vehicle by determining if the cellular-enabled modem of the telematics unit has a cellular connection with a cellular telecommunication network. Commanding a resident vehicle subsystem to automate a remediating action may be further in response to the telematics unit's cellular-enabled modem having a cellular connection with a cellular telecommunication network. The vehicle's wireless communications device may include one or more short-range communication devices. In this instance, the SRC device may respond to the telematics unit not having a cellular connection by broadcasting a distress message indicating the host vehicle is the target vehicle. As a further option, the vehicle controller may, concurrent with or after broadcasting the distress message, activate the vehicle's hazard lamp system and/or slow the vehicle's powertrain system to bring the host vehicle to a stop.

For any of the disclosed vehicles, methods, and CRM, the host vehicle's wireless communications device may include a cellular-enabled device (e.g., telematics unit or occupant smartphone) and an SRC device (e.g., BLUETOOTH® Low Energy (BLE) module or dedicated short-range communications (DSRC) unit). In this example, determining whether or not the wireless communications device has an active wireless connection may include the cellular-enabled device establishing a cellular connection with a cellular telecommunication network (e.g., actively exchanging radio-wave signals with a cell tower of a base station). If an active connection is not established, the host vehicle may responsively scan for advertisement of the emergency alert from assorted third-party vehicles and, if broadcast, employ the SRC device to receive the emergency alert from a third-party vehicle. As a further option, the host vehicle may respond to a cellular connection being established by employing the SRC device to scan for third-party vehicles broadcasting distress messages. Using the SRC device, the host vehicle may receive, from one of the third-party vehicles, a distress message indicating that third-party vehicle is the target vehicle. In this instance, the in-vehicle telematics unit may transmit an alert message to a first responder with location data and identification data of that third-party vehicle being the target vehicle.

For any of the disclosed vehicles, methods, and CRM, the remote computing node may be a local or national emergency alert system, the host vehicle's resident vehicle subsystem may include a telematics unit, and the remediating action may include the telematics unit transmitting an alert message to a first responder with location data of the host vehicle and identification data of the host vehicle being the target vehicle. As another option, the resident vehicle subsystem may include the host vehicle's hazard lamp system and/or the host vehicle's powertrain system. In this instance, the remediating action may include activating the hazard lamp system and/or slowing the powertrain system to bring the host vehicle to a stop. The resident vehicle subsystem may also include a resident anti-theft system and/or a resident autosteer system. In this instance, the remediating action may include the anti-theft system automatically activating a remote ignition block (RIB) mode that prevents activation of a prime mover in the host vehicle's powertrain system and/or the autosteer system automatically steering the host vehicle to a desired location.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
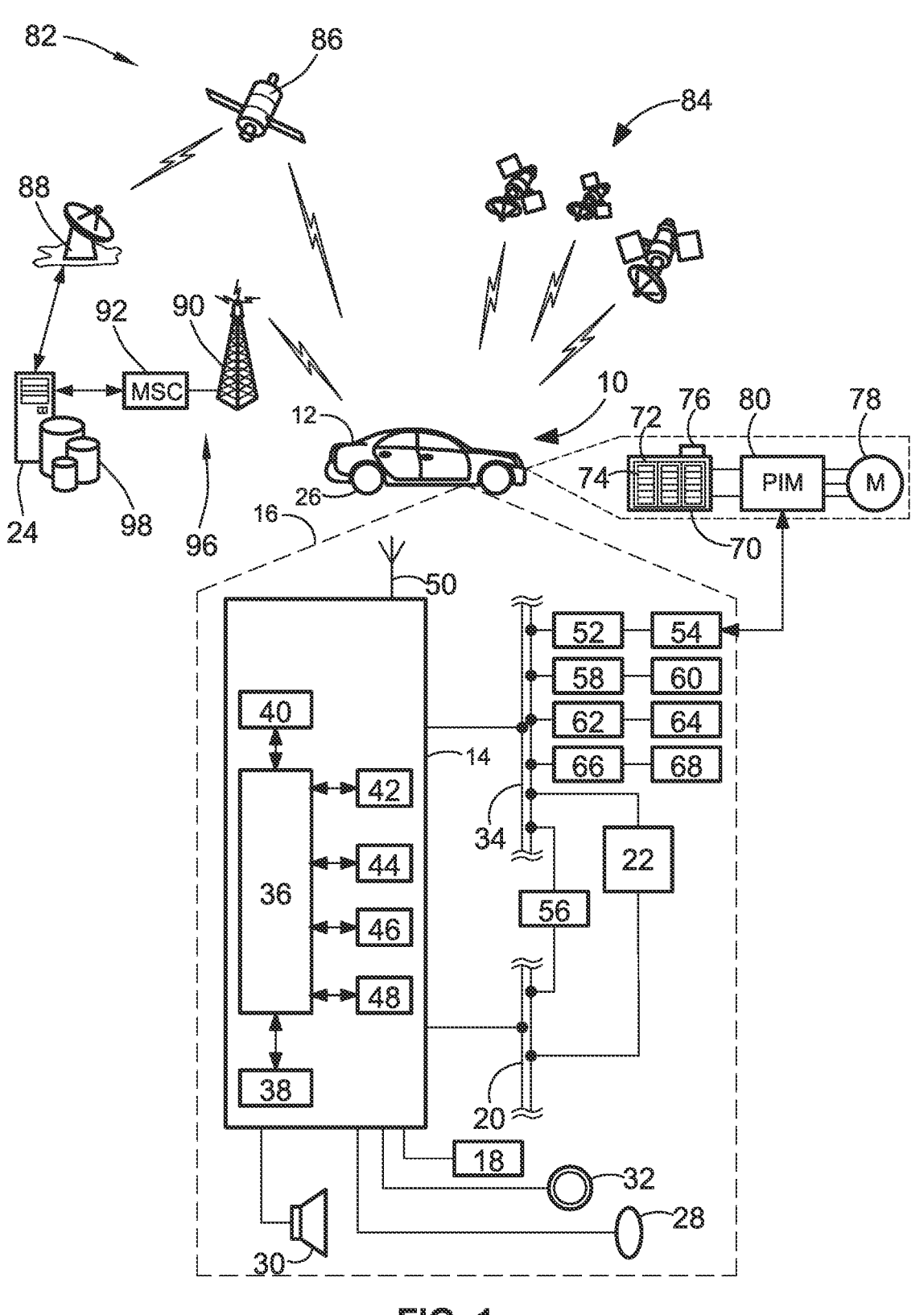
FIG. 1 is a partially schematic, side-view illustration of a representative motor vehicle with a network of in-vehicle controllers, sensing devices, and communication devices for provisioning a self-detection and violation-notification (SDVN) operating mode in accord with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this Detailed Description, unless specifically disclaimed: the singular includes the plural and vice versa; the words "and" and "or" shall be both conjunctive and disjunctive; the words "any" and "all" shall both mean "any and all"; and the words "including." "containing." "comprising." "having." and the like, shall each mean "including without limitation." Moreover, words of approximation, such as "about." "almost." "substantially," "generally." "approximately." and the like, may each be used herein to denote "at, near, or nearly at," or "within 0-5% of." or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, incorporation of the present concepts into the illustrated wireless communications network for broadcasting amber alerts to connected vehicles should also be appreciated as a non-limiting implementation of disclosed features. As such, it will be understood that aspects and features of this disclosure may be applied to other wireless network architectures, implemented for wireless transmission of other types of electronic messages, and incorporated into any logically relevant type of vehicle. Moreover, only select components of the motor vehicles and wireless communications networks are shown and described in additional detail herein. Nevertheless, the vehicles and systems discussed below may include numerous additional and alternative features, and other available peripheral components, for carrying out the various methods and functions of this disclosure.

The representative vehicle 10 of FIG. 1 is originally equipped with a vehicle telecommunications and information ("telematics") unit 14 that wirelessly communicates, e.g., via cell towers, wireless modem, mesh network, satellite service, etc., with a remotely located back-office (BO), cloud-computing host service 24 (e.g., ONSTAR® or MYGMC®). Some of the other in-vehicle hardware components 16 shown generally in FIG. 1 include, as non-limiting examples, an electronic video display device 18, a microphone 28, an audio speaker 30, and assorted user input controls 32 (e.g., buttons, knobs, switches, touchpads, joysticks, touchscreens, etc.). These hardware components 16 function, in part, as a human-machine interface (HMI) that enables a user to communicate with the telematics unit 14 and other components resident to and remote from the vehicle 10. Microphone 28, for instance, provides occupants with a means to input verbal or other audible commands; the vehicle 10 employs an embedded voice-processing unit utilizing audio filtering, editing, and analysis modules to convert the inputs to signals. Conversely, the speaker(s) 30 provide audible output to a vehicle occupant and may be either a stand-alone speaker dedicated for use with the telematics unit 14 or may be a part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to automate assorted vehicle functions, such as modulating powertrain output, activating friction or regenerative brakes, controlling vehicle steering, managing operation of a traction battery pack, controlling vehicle safety and anti-theft systems, and other automated functions. For instance, telematics unit 14 may exchange signals with a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, a multicore processor, an application specific integrated circuit (ASIC), a dedicated control module, and/or other suitable IC device or network of devices. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC memory device, solid-state drive (SSD) memory, hard-disk drive (HDD) memory, flash memory, semiconductor memory (e.g., various types of RAM or ROM), etc.

Long-range communication (LRC) capabilities with remotely located off-board devices may be provided via one or more or all of a cellular chipset, an ultra-high frequency (UHF) radio transceiver, a satellite-communication (SAT-COM) component (e.g., global positioning system (GPS) transceiver), and/or a wireless modem, all of which are collectively represented at 44 in FIG. 1. Short-range communication (SRC) capabilities may be provided via a close-range communication device 46 (e.g., a BLUETOOTH® unit or near field communications (NFC) transceiver), UWB or LPWAN comm device, a dedicated short-range communications (DSRC) component 48, and/or a dual antenna 50. The communications devices described above may provision data exchanges as part of a periodic broadcast in a vehicle-to-vehicle (V2V) communications network or a vehicle-to-everything (V2X) communications network, e.g., Vehicle-to-Infrastructure (V2I), Vehicle-to-Pedestrian (V2P), Vehicle-to-Device (V2D), etc. It is envisioned that the vehicle 10 may be implemented without one or more of the above listed components or, optionally, may include additional components and functionality as desired for a particular end use.

CPU 36 of FIG. 1 receives sensor data from one or more sensing devices that use, for example, image detection, radar, laser, ultrasonic, optical, infrared, or other suitable technology, including short-range communications technologies (e.g., DSRC, ad-hoc mesh LAN, BLUETOOTH® or BLE®) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of on-vehicle sensors may be adapted, singly or collectively, to a given vehicle platform for achieving a desired level of automation and concomitant autonomous vehicle operation.

To propel the motor vehicle 10, an electrified powertrain is operable to generate and deliver tractive torque to one or more of the vehicle's drive wheels 26. The vehicle's electrified powertrain is generally represented in FIG. 1 by an electric traction motor 78 that is operatively connected to a rechargeable energy storage system (RESS), which may be in the nature of a chassis-mounted traction battery pack 70. The traction battery pack 70 may be generally composed of one or more battery modules 72 each containing a group of electrochemical battery cells 74, such as lithium ion, lithium polymer, or nickel metal hydride battery cells. Traction motor/generator (M) unit 78 draws electrical power from and, optionally, delivers electrical power to the battery pack 70. A power inverter module (PIM) 80 electrically connects the battery pack 70 to the motor/generator unit(s) 78 and modulates the transfer of electrical current therebetween. The battery pack 70 may be configured such that module management, cell sensing, and module-to-module or module-to-host communications functionality is integrated directly into each module 72 and performed wirelessly via a wireless-enabled cell monitoring unit (CMU) 76.

Also shown in FIG. 1 is a mobile vehicle communications (MVC) system 82 that enables wireless communications between remotely located computing nodes and one or more motor vehicles 10. MVC system 82 is represented herein by a constellation of GPS satellites 84, a wireless services satellite 86, an uplink transmitting station 88, a cellular (cell) transceiver tower 90, and a mobile switching center (MSC) 92. A host vehicle's GPS transceiver 44 may exchange radio signals with the GPS satellites 84 to derive real-time or near real-time geopositional and time data for the vehicle 10, which may be used to provide navigation and other related services to vehicle occupants. Wireless services satellite 86, through cooperative operation with the uplink transmitting station 88, provisions unidirectional and bidirectional communications with the vehicle 10, such as satellite radio and media services (e.g., music, news, videos, etc.) and satellite telephony services (e.g., to contact a remote vehicle command center). While shown with a single vehicle 10 communicating with multiple GPS satellites 84, a single wireless services satellite 86, a single uplink station 88, a single cell tower 90, and a single MSC 92, MVC system 82 may incorporate any number and combination of the foregoing elements as well as other available and hereafter developed communications hardware.

The MVC system 82 may operate within a cellular communications system 96, which is represented in FIG. 1 by one or more cell towers 90, one or more mobile switching centers 92, as well as any other networking components needed to link the cellular communications system 96 with assorted end nodes (e.g., BO host service 24). Each cell tower 90 may be equipped with a respective set of sending and receiving antennas for exchanging radio signals with vehicles 10. Base stations of the different cell towers may be connected to the MSC 92 either directly or via intermediary equipment, such as a base station controller (not shown). The cellular communications system 96 may implement any suitable communications technology, including earlier cellular protocols, such as cellular digital packet data (CDPD) 2G technologies, or contemporary cellular protocols, such as 4G-LTE of 5G-Advanced technologies. Vehicle telematics unit 14 may function as a cellular-enabled mobile component that is registered with a cellular carrier to transmit network data packets to and from the cellular communications system 96. It should be appreciated that the system 96 may take on innumerable tower/station/MSC arrangements, including co-location of a base station and a cell tower at the same site, remotely locating base stations and cell towers from one another, a single base station servicing a single cell tower, a single cell servicing multiple cell towers, and coupling multiple base stations to a single MSC, to name but a few possible arrangements.

During operation of the motor vehicle 10, the telematics unit 14 may systematically exchange wireless messages and data with a myriad of off-board entities using the on-vehicle LRC devices 44 and SRC devices 46, 48. For instance, an authorized federal, state, or local agency, such as a law enforcement agency (LEA) or an intelligence and security service (FBI), may broadcast a Wireless Emergency Alert (WEA) message for an amber alert, a severe weather event, a criminal activity, a natural disaster, etc. For an amber alert or other criminal activity, disclosed systems and methods do not rely on pedestrians and bystanders to help locate and report the suspected culprit(s); rather, the sensing, computing, and wireless capabilities of crowd-sourced vehicles are leveraged to enhance culprit identification. Disclosed systems and methods are able to quickly and accurately identify a target vehicle of a culprit and do so without informing the suspected target vehicle's occupants and without relying on visual recognition of the culprit and/or the culprit's vehicle. Furthermore, disclosed systems and methods leverage V2V and V2X communications capabilities and, thus, do not rely solely on cellular telecommunications.

An Emergency Alert System (EAS) may periodically broadcast emergency alert information by cellular network, satellite service, analog and digital radio, and broadcast television. For vehicular applications in which such communication modalities are unavailable, multi-hop V2V channels may be employed to broadcast this emergency information to vehicles without cellular or satellite connectivity. From this alert, a subject "host" vehicle may ascertain whether or not it is the target "culprit" vehicle in question, e.g., by parsing license plate and VIN data from a received LEA alert, retrieving the host vehicle's VIN/plate information from vehicle memory, and mapping the parsed culprit data with the host vehicle data to see if they match. Mapping between the culprit data and a suspected target vehicle's data may be provisioned by a dedicated SDVN module, a center-stack telematics unit, or a dedicated mobile application operating on an occupant's smartphone. This multistep notification protocol may consider a host vehicle's operating state, identify its communication capabilities, and leverage its on-vehicle sensor network.

Initially, a host vehicle may be notified over a cellular network that the vehicle has a cellular connection. Wireless messages containing emergency alerts may be transmitted to the host vehicle by law enforcement, back-office vehicle service, nearby vehicles, etc. If a self-identified target vehicle does not have a cellular connection, the vehicle may continually broadcast, e.g., over BLE, WiFi, V2V, etc., a distress message that it is likely the target "culprit" vehicle. In addition to notifying first responders, a target vehicle may also effect autonomous driving capabilities to autosteer itself to a desired "safe" location, cautiously slow and stop the vehicle, activate its horn and/or hazard light system, and/or disable itself. If a host vehicle determines that it is not the target vehicle in question, the host vehicle may employ its resident sensor array and communications capabilities to periodically scan proximal "third-party" vehicles to see if one matches the parsed culprit data. If one of the nearby vehicles is identified to likely be the target "culprit" vehicle, the host vehicle may notify an LEA or a BO vehicle service provider with the target's real-time location, heading, and other pertinent data.

Figure 2:
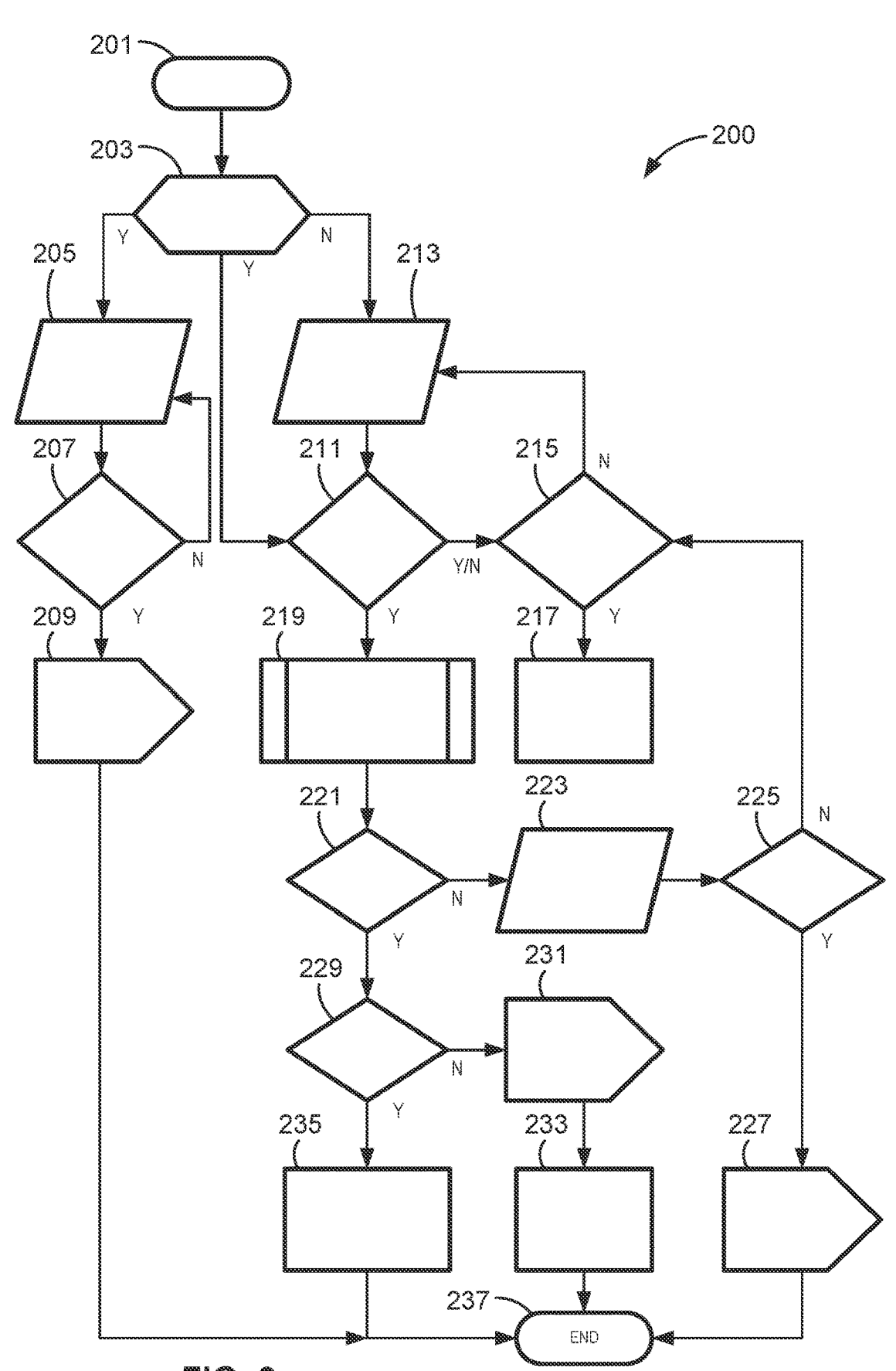
FIG. 2 is a flowchart illustrating a representative vehicle control method for automating detection and notification of a target vehicle for a connected host vehicle, which may correspond to memory-stored instructions that are executable by a resident or remote controller, control-logic circuit, programmable control unit, or other integrated circuit (IC) device or network of devices in accord with aspects of the disclosed concepts.

With reference next to the flow chart of FIG. 2, an improved method or control strategy for automating detection and notification of a target vehicle by a connected host vehicle, such as automobile 10 of FIG. 1, is generally described at 200 in accordance with aspects of the present disclosure. Some or all of the operations illustrated in FIG. 2 and described in further detail below may be representative of an algorithm that corresponds to non-transitory, processor-executable instructions that are stored, for example, in main or auxiliary or remote memory (e.g., vehicle memory device 38 and/or BO host service database 98 of FIG. 1), and executed, for example, by an electronic controller, processing unit, dedicated control module, logic circuit, or other module or device or network of controllers/modules/devices (e.g., vehicle CPU 36 and/or BO host service 24 server of FIG. 1), to perform any or all of the above and below described functions associated with the disclosed concepts. It should be recognized that the order of execution of the illustrated operation blocks may be changed, additional operation blocks may be added, and some of the herein described operations may be modified, combined, or eliminated.

Method 200 begins at START terminal block 201 of FIG. 2 with memory-stored, processor-executable instructions for a programmable controller or control module or network of controllers/modules to call up an automated self-detection and violation-notification (SDVN) procedure for a connected vehicle. This routine may be executed in real-time, near real-time, continuously, systematically, and/or at predefined time intervals, for example, each 10 or 100 milliseconds during normal operation of the motor vehicle 10. As yet another option, terminal block 201 may initialize responsive to a user command prompt (e.g., via telematics input controls 32), a resident vehicle controller prompt (e.g., from CPU 36), or a broadcast prompt signal received from a centralized backend vehicle services system (e.g., from BO host service 24). By way of non-limiting example, method 200 may automatically initialize during a key-on event in which a driver, owner, occupant, or other authorized operator of the vehicle 10 (collectively "user") powers on the vehicle powertrain or enters vehicle accessory mode. Upon completion of some or all of the control operations presented in FIG. 2, method 200 may advance to END terminal block 237 and temporarily terminate or, optionally, may loop back to terminal block 201 and run in a continuous loop. Terminal block 237 may be automatically triggered in response to a key-off event in which a user powers off the vehicle powertrain/accessories.

Advancing from terminal block 201 to CELLULAR CONNECTION 1 decision block 203, method 200 may execute memory-stored instructions to determine whether or not the host vehicle has an active cellular connection with a cellular telecommunication network. In a non-limiting example, a vehicle controller may collect signal state data indicative of a real-time or near real-time cell signal state of the host vehicle, which may include actively measuring the cellular signal quality of a host vehicle. Upon receipt of an ignition activation request, for example, the vehicle CPU 36 may responsively communicate with the telematics unit's 14 cellular chipset and UHF radio transceiver (LRC device 44) to retrieve wireless signal data indicative of a wireless signal state, e.g., signal quality (decibels (dB)) and/or signal strength (decibel milliwatts (dBm)) of the unit. In telecommunications, signal strength typically refers to the transmitter power output as received by a reference antenna at a distance from the transmitting antenna. Cellular signal strength, which may be reported as Reference Signal Received Power (RSRP), is typically measured in decibel milliwatts and may range from approximately −30 dBm to −110 dBm. In general, a signal strength better than about −50 dBm (i.e., closer to zero) is considered a strong signal, a signal strength better than about −85 dBm is considered a usable signal, and a signal strength less than about −100 dBm is considered a weak signal. Method 200 may conclude that the host vehicle has cellular connectivity upon confirming that the telematics unit 14 has a cellular signal strength greater than about −80 dBm.

Upon confirming that the host vehicle has sufficient cellular connectivity (Block 203=YES), method 200 may continue to DISTRESS SCAN data input block 205 to examine vehicles that are within proximity to the host vehicle and may be disseminating a distress signal. In accord with the illustrated example, the motor vehicle 10 of FIG. 1 may employ any one or more of the above-described SRC devices 46, 48 to periodically scan third-party vehicles within a preset proximity (e.g., about 50 meters (m) for UWB; about 100 m for BLE; about one (1) kilometer (km) for DSRC) to identify vehicles that are actively broadcasting distress messages. A host vehicle's center-stack telematics unit 14 may instruct a dedicated BLE control module to periodically scan available BLUETOOTH®-based "advertisement" channels for vehicle-generated messages; the application may look for a Universally Unique Identifier (UUID) embedded in a wireless electronic message that denotes a vehicle is in distress.

At DISTRESS MESSAGE decision block 207, a host vehicle determines whether or not it has received a wireless distress message from one of the proximal third-party vehicles across an available short-range communication channel. For an amber alert or other criminal activity, a distress message may contain information indicating that the message-generating vehicle is a suspected target "culprit" vehicle corresponding to the emergency alert event. In addition to receiving and temporarily storing a distress message, decision block 207 may also prompt the recipient host vehicle to evaluate the distress message to extract, evaluate, and corroborate the veracity of material information embedded in the message.

Responsive to receipt of a distress message (Block 207=YES), the method 200 executes VIOLATION NOTIFICATION 1 signal output block 209 whereat the host vehicle informs authorities or other interested parties that the target vehicle has been identified. By way of example, and not limitation, the telematics unit 14 of FIG. 1 may contact a first responder—either directly (e.g., via LRC device 44) or indirectly (e.g., via BO host service 24)—and transmit thereto an alert message notifying them that the target has been found and providing location data and identification data identifying the third-party vehicles as the suspected target vehicle. While not per se limited, the distress message processes of the algorithm shown in FIG. 2 are particularly beneficial for target vehicles that do not themselves have an active cellular connection or other means for contacting authorities.

By confirming that the host vehicle has sufficient cellular connectivity (Block 203=YES), method 200 may advance to EMERGENCY ALERT decision block 211 to determine whether or not an emergency alert was received by the host vehicle from a remote computing node. In contrast to decision block 207, in which the host vehicle 10 uses an SRC device 46, 48 to scan for and receive a distress message, decision block 211 may include the host vehicle employing a cellular chipset, UHF radio transceiver, or other suitable LRC device 44 to receive a wireless electronic message containing an emergency alert. As indicated above, the remote computing node may take on many form factors, including an emergency alert system that is tasked with broadcasting emergency alerts and warning messages to the public. Receipt of an emergency alert may be direct, e.g., via telematics unit 14 receiving a push/email/SMS/MMS from the EAS, or indirect, e.g., via the telematics unit 14 piggybacking an occupant-borne smartphone or engaging a BO vehicle service 24 to receive data, messages, and other pertinent information. The received wireless message may contain an emergency alert (e.g., THIS IS AN AMBER ALERT!) and culprit data identifying a target vehicle (e.g., PLEASE BE ON THE LOOKOUT FOR THE FOLLOWING). The target vehicle's culprit data may contain any distinguishing information, such as a license plate number, a VIN, an IP address, a vehicle color, a vehicle make/model/trim/year, driver information, victim information, etc.

A host vehicle may respond to not having an active cellular connection (Block 203=NO) by executing ALERT SCAN data input block 213 and examining vehicles that are within proximity to the host vehicle to detect any that may be relaying an alert signal. Similar to data input block 205, the motor vehicle 10 of FIG. 1 may employ any of the above-described SRC devices 46, 48 to periodically scan third-party vehicles within a preset proximity of the host to identify which, if any, of those vehicles are actively broadcasting a wireless message containing an emergency alert. A potential target without cellular connectivity may therefore scan advertisements for an amber alert or a crime alert based on a UUID and, from this information, attempt to determine whether or not it is the associated target. In this manner, a host vehicle may receive emergency alerts via both LRC channels (e.g., cellular data packet from EAS) and SRC channels (e.g., multi-hop V2V data packet received from nearby vehicle). It is envisioned that either EMERGENCY ALERT decision block 211 or ALERT SCAN data input block 213 may be performed contemporaneous with DISTRESS SCAN data input block 205 to increase the likelihood of the host vehicle identifying the target vehicle.

Prior to, contemporaneous with, or after receiving a wireless message with an emergency alert, method 200 may execute ALERT CANCELLATION decision block 215 to determine whether or not an active emergency alert has been cancelled. Upon receipt of a wireless cancellation message notifying a recipient host vehicle that a previously issued emergency alert has been cancelled (Block 215—YES), method 200 may responsively execute CANCEL SCAN process block 217 and command one or more of the on-vehicle cameras, SRC units, and other communications and sensing devices to discontinue scanning vehicles proximal the host vehicle for the target vehicle. For instance, the digital cameras 62 and BLE SRC device 46 of motor vehicle 10 of FIG. 1 may continually scan for distress signals, emergency alerts, and flagged culprits. It is possible that a host vehicle may have missed the initial wireless message, e.g., because of an insufficient cellular connection or failed download procedure, and therefore not received the initial emergency alert (Block 211=NO). In response to receiving a cancellation message, the host may automatically cancel ongoing camera scans, BLE scans, etc.

Upon receipt of a new emergency alert (Block 211=YES), method 200 may responsively execute PARSE ALERT predefined process block 219 to identify and extract pertinent information contained in the received alert. CPU 36 of FIG. 1, for example, may download an incoming wireless message, locate a body (payload) segment of the message, and parse therefrom the pertinent culprit data. Parsing may depend on a designated structure of the message, be it a standardized format or a unique format customized to a desired end application. For instances in which a BLE peripheral device broadcasts BLE advertisement packets as packet data units (PDUs) to all BLE-compatible devices within range, the host vehicle's CPU 36 retrieves the BLE advertisement and accesses the PDU's variable payload and extracts therefrom the embedded culprit data. The parsed culprit data may be temporarily stored by the CPU 36 in cache memory or a data buffer within memory device(s) 38.

After parsing the alert for relevant information, a host vehicle may execute SELF-DETECT decision block 221 by evaluating the parsed information to determine whether or not the host vehicle is the target "culprit" vehicle identified in the emergency alert. Continuing with the non-limiting discussion of the example in FIG. 1, the vehicle CPU 36 may retrieve the culprit data from buffer/cache memory and concurrently retrieve corresponding host vehicle data from a dedicated data field in memory device(s) 38. The CPU 36 then compares the respective host vehicle data with the parsed culprit data to determine if the host vehicle is the target vehicle. A positive ID of the host vehicle as the target vehicle may include matching the host vehicle's license plate number and VIN with the suspect target vehicle's license plate number and VIN. To obviate an erroneous false-positive result, the CPU 36 may perform secondary comparisons, such as attempting to match the host vehicle's make/model/year with the target vehicle's make/model/year.

Responsive to a determination that the host vehicle is not the target vehicle (Block 221=NO), the method 200 may automatically execute TARGET SCAN data input block 223 and attempt to identify the target vehicle from among those vehicles proximal to the host vehicle. Vehicle 10 of FIG. 1, for example, may employ any one or more of the SRC devices 46, digital cameras 62, and/or other resident sensing device to systematically scan third-party vehicles proximal the host vehicle. It is envisioned that TARGET SCAN data input block 223 may be performed contemporaneously with DISTRESS SCAN data input block 205 to increase the likelihood of the host vehicle finding the target vehicle.

While scanning third-party vehicles within range of its sensor array, the host vehicle may execute TARGET MATCH decision block 225 to determine whether or not each scanned third-party vehicle is the target "culprit" vehicle identified in the emergency alert. For instance, CPU 36 may concomitantly compare image data captured by the digital camera(s) 62 and/or vehicle-specific identification data retrieved by the SRC device(s) 46 with their corresponding portions of the culprit data parsed from the alert message. By assessing whether or not the retrieved data matches the parsed data, the CPU 36 may determine whether or not one of the scanned third-party vehicles is the target vehicle. Responsive to a positive identification of a scanned third-party vehicle as the target vehicle (Block 225=YES), the host vehicle may automatically execute VIOLATION NOTIFICATION 2 signal output block 227 and inform authorities or other interested parties that the target vehicle has been identified. It is envisioned that signal output block 227 may take on any of the features and options described above with respect to signal output block 209. For instance, telematics unit 14 of FIG. 1 may wirelessly contact a local LEA and transmit thereto an alert message that contains real-time or near real-time location data and identification data of the scanned third-party vehicle that is believed to be the target vehicle.

Responsive to a determination that the host vehicle is the target vehicle (Block 221=YES), the method 200 may automatically execute CELLULAR CONNECTION 2 decision block 229 to determine whether or not the host vehicle has an active cellular connection with a cellular telecommunication network. It is envisioned that decision block 229 may take on any of the features and options described above with respect to decision block 203. A host vehicle may respond to not having an active cellular connection (Block 229=NO) by executing DISTRESS BROADCAST signal output block 231 and outputting a distress signal to third-party vehicles within proximity to the host. By way of example, vehicle 10 may employ any of the available SRC devices 46, 48 to broadcast a distress message with real-time or near real-time location data and identification data indicating the host vehicle is the target vehicle. In a specific example, the telematics unit 14 utilizes its BLE or V2V capabilities to broadcast an SMS alert reading "THIS IS TARGET VEHICLE FOR ALERT XYZ; GPS COORDINATES ARE X,Y; HEADING SOUTHWEST AT XX MPH; FOLLOWING OCCUPANT DEVICES AVAILABLE: D1, D2 . . . . DN; CONTACT LAW ENFORCEMENT".

During broadcast of the distress signal, the host vehicle may concurrently execute one or more ameliorative actions at ALERT REMEDIATION 1 process block 233. Concurrent with or after broadcasting a wireless distress message, for example, the host vehicle may activate its hazard lamp system (e.g., simultaneous blinking activation of all turn signal lights). As an additional or alternative option, the host vehicle controller may actively slow the vehicle powertrain system to bring the host vehicle to a stop. Once stopped, an ignition block may be implemented to prevent restarting of the vehicle; at the same time, all vehicle doors may be unlocked. It may be desirable, for at least some applications, that the vehicle driver and passengers of the now-identified target vehicle not be notified that their vehicle has been IDed as the target in light of the fact that one of these occupants may be a suspect in a criminal activity. At this juncture, method 200 may transition to END terminal block 237 and terminate or may loop back to START terminal block 204.

After confirming that the host vehicle has sufficient cellular connectivity (Block 229=YES), method 200 may advance to ALERT REMEDIATION 2 process block 235 and take ameliorative action to address the emergency alert. It is envisioned that decision process block 235 may take on any of the features and options described above with respect to process block 233, and vice versa. The vehicle CPU 36 of FIG. 1, for example, may output one or more command signals to one or more of the host vehicle's resident vehicle subsystems to automate one or more remediating actions for the emergency alert. As noted above, the in-vehicle telematics unit 14 may contact one or more first responders and transmit thereto an alert message with host vehicle location data, host vehicle identification data, and any other pertinent information that identifies the host as the target. Additionally, the CPU 36 may activate the host vehicle's hazard lamp system and, if desired, slowing of the vehicle powertrain system to bring the host vehicle to a stop. It may be desirable that the CPU 36 also communicates with the host vehicle's resident anti-theft system and automatically activates a remote ignition block (RIB) mode that prevents restarting of vehicle's engine and/or motors.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of controlling operation of a host vehicle, the method comprising:

determining, via a vehicle controller resident to a vehicle body of the host vehicle, a wireless communications device resident to the vehicle body of the host vehicle has an active wireless connection with a remote computing node remote from the host vehicle;

receiving, from the remote computing node via the wireless communications device, a wireless message containing an emergency alert and culprit data indicative of a target vehicle;

parsing, via the vehicle controller, the culprit data from the wireless message, the parsing including downloading the wireless message to a memory storage device, locating a payload segment of the wireless message with the culprit data embedded therein, and extracting the embedded culprit data from the payload segment;

analyzing, via the vehicle controller resident to the vehicle body of the host vehicle, the parsed culprit data to determine if the host vehicle is the target vehicle; and transmitting, via the vehicle controller responsive to determining the host vehicle is the target vehicle and without using the active wireless connection with the remote computing node, a command signal to a resident vehicle subsystem of the host vehicle to automate a remediating action for the emergency alert.

2. The method of claim 1, further comprising:

scanning, via a sensing device of the host vehicle responsive to determining the host vehicle is not the target vehicle, third-party vehicles proximal the host vehicle;

determining if one of the scanned third-party vehicles is the target vehicle; and transmitting, to a first responder via a telematics unit of the host vehicle responsive to the one of the scanned third-party vehicles being the target vehicle, an alert message indicative of a location and identification of the one of the scanned third-party vehicles as the target vehicle.

3. The method of claim 2, further comprising:

receiving, via the wireless communications device, a wireless cancellation message cancelling the emergency alert; and commanding, via the vehicle controller responsive to receipt of the wireless cancellation message, the sensing device of the host vehicle to discontinue scanning the third-party vehicles proximal the host vehicle for the target vehicle.

4. The method of claim 1, wherein the wireless communications device includes a cellular-enabled telematics unit in the host vehicle, the method further comprising:

determining, via the vehicle controller responsive to the host vehicle being the target vehicle, the cellular-enabled telematics unit has a cellular connection with a cellular telecommunication network, wherein transmitting the command signal to the resident vehicle subsystem to automate the remediating action is further responsive to the cellular-enabled telematics unit having the cellular connection with the cellular telecommunication network.

5. The method of claim 4, wherein the wireless communications device further includes a short-range communication (SRC) device, the method further comprising broadcasting, via the SRC device responsive to the telematics unit not having the cellular connection, a distress message indicating the host vehicle is the target vehicle.

6. The method of claim 5, wherein the resident vehicle subsystem includes a hazard lamp system and/or a powertrain system, the method further comprising, concurrent with or after broadcasting the distress message, activating the hazard lamp system and/or slowing the powertrain system to bring the host vehicle to a stop.

7. The method of claim 1, wherein the culprit data of the target vehicle includes a license plate number, a vehicle identification number, an internet protocol address, a vehicle color, and/or a vehicle make and model.

8. The method of claim 1, wherein the wireless communications device of the host vehicle includes a cellular-enabled telematics unit in the host vehicle, and wherein determining the wireless communications device has the active wireless connection includes the telematics unit establishing a cellular connection with a cellular telecommunication network.

9. The method of claim 8, wherein the wireless communications device further includes a short-range communication (SRC) device, the method further comprising:

scanning, responsive to the telematics unit not establishing the cellular connection with the cellular telecommunication network, for receipt of the emergency alert from a third-party vehicle; and receiving, via the SRC device, the emergency alert from the third-party vehicle.

10. The method of claim 8, wherein the wireless communications device further includes a short-range communication (SRC) device, the method further comprising:

scanning, via the SRC device responsive to the telematics unit establishing the cellular connection, for receipt of distress messages from third-party vehicles;

receiving, from one of the third-party vehicles via the SRC device, a distress message indicating the one of the third-party vehicles is the target vehicle; and transmitting, via the telematics unit to a first responder, an alert message indicative of a location and identification of the one of the third-party vehicles as the target vehicle.

11. The method of claim 1, wherein the remote computing node is an emergency alert system, the resident vehicle subsystem includes a telematics unit, and the remediating action includes transmitting, via the telematics unit to a first responder, an alert message indicative of a location and identification of the host vehicle as the target vehicle.

12. The method of claim 1, wherein the resident vehicle subsystem includes a hazard lamp system and/or a powertrain system, and the remediating action includes activation of the hazard lamp system and/or slowing of the powertrain system to bring the host vehicle to a stop.

13. The method of claim 1, wherein the resident vehicle subsystem includes a resident anti-theft system, and the remediating action includes the resident anti-theft system automatically activating an ignition block mode operable to prevent activation of a prime mover in a powertrain system of the host vehicle.

14. A non-transitory, computer-readable medium storing instructions executable by one or more processors of a vehicle controller of a host vehicle, the host vehicle including a wireless communications device, the instructions, when executed by the one or more processors, causing the vehicle controller to perform operations comprising:

determining if the wireless communications device of the host vehicle has an active cellular connection with a remote computing node remote from the host vehicle via a cellular telecommunication network;

receiving, from the remote computing node via the wireless communications device, a wireless message containing an emergency alert and culprit data indicative of a target vehicle;

parsing the culprit data from the wireless message, the parsing including downloading the wireless message to a resident memory storage device of the host vehicle, locating a payload segment of the wireless message, and extracting from the payload segment embedded culprit data;

analyzing the parsed culprit data to determine if the host vehicle is the target vehicle; and responsive to determining the host vehicle is the target vehicle and without using the active wireless connection with the remote computing node, commanding a resident vehicle subsystem of the host vehicle to automate a remediating action for the emergency alert.

15. A motor vehicle, comprising:

a vehicle body with a passenger compartment;

a plurality of road wheels attached to the vehicle body;

a powertrain system attached to the vehicle body and configured to drive one or more of the road wheels to thereby propel the motor vehicle;

a wireless communications device attached to the vehicle body;

a memory storage device attached to the vehicle body; and a vehicle controller attached to the vehicle body and programmed to:

determine the wireless communications device has an active wireless connection with a remote computing node remote from the host vehicle;

receive, from the remote computing node via the wireless communications device, a wireless message containing an emergency alert and culprit data indicative of a target vehicle;

parse the culprit data from the wireless message by downloading the wireless message to the memory storage device, locating a payload segment of the wireless message, and extracting from the payload segment embedded culprit data;

analyze the parsed culprit data to determine if the motor vehicle is the target vehicle; and responsive to determining the motor vehicle is the target vehicle and without using the active wireless connection with the remote computing node, commanding the powertrain system of the motor vehicle to automate a remediating action for the emergency alert, the remediating action including restricting or suspending operation of the powertrain system.

16. The motor vehicle of claim 15, wherein the vehicle controller is further programmed to:

scan, via a sensing device of the motor vehicle responsive to determining the motor vehicle is not the target vehicle, third-party vehicles proximal the motor vehicle;

determine if one of the scanned third-party vehicles is the target vehicle; and transmit, to a first responder via a telematics unit of the motor vehicle responsive to the one of the scanned third-party vehicles being the target vehicle, an alert message indicative of a location and identification of the one of the scanned third-party vehicles as the target vehicle.

17. The motor vehicle of claim 16, wherein the vehicle controller is further programmed to:

receive, via the wireless communications device, a wireless cancellation message cancelling the emergency alert; and responsive to receipt of the wireless cancellation message, command the sensing device of the motor vehicle to discontinue scanning the third-party vehicles proximal the motor vehicle for the target vehicle.

18. The motor vehicle of claim 15, wherein the wireless communications device includes a telematics unit, and wherein the vehicle controller is further programmed to:

responsive to the motor vehicle being the target vehicle, determine if the telematics unit has a cellular connection with a cellular telecommunication network, wherein commanding the powertrain system to automate the remediating action is further responsive to the telematics unit having the cellular connection with the cellular telecommunication network.

19. The motor vehicle of claim 18, wherein the wireless communications device further includes a short-range communication (SRC) device, and wherein the vehicle controller is further programmed to broadcast, via the SRC device responsive to the telematics unit not having the cellular connection, a distress message indicating the motor vehicle is the target vehicle.

20. The motor vehicle of claim 15, wherein the wireless communications device of the motor vehicle includes a telematics unit in the motor vehicle, and wherein determining the wireless communications device has the active wireless connection includes the telematics unit establishing a cellular connection with a cellular telecommunication network.

* * * * *